United States Patent Office 3,195,323
Patented July 20, 1965

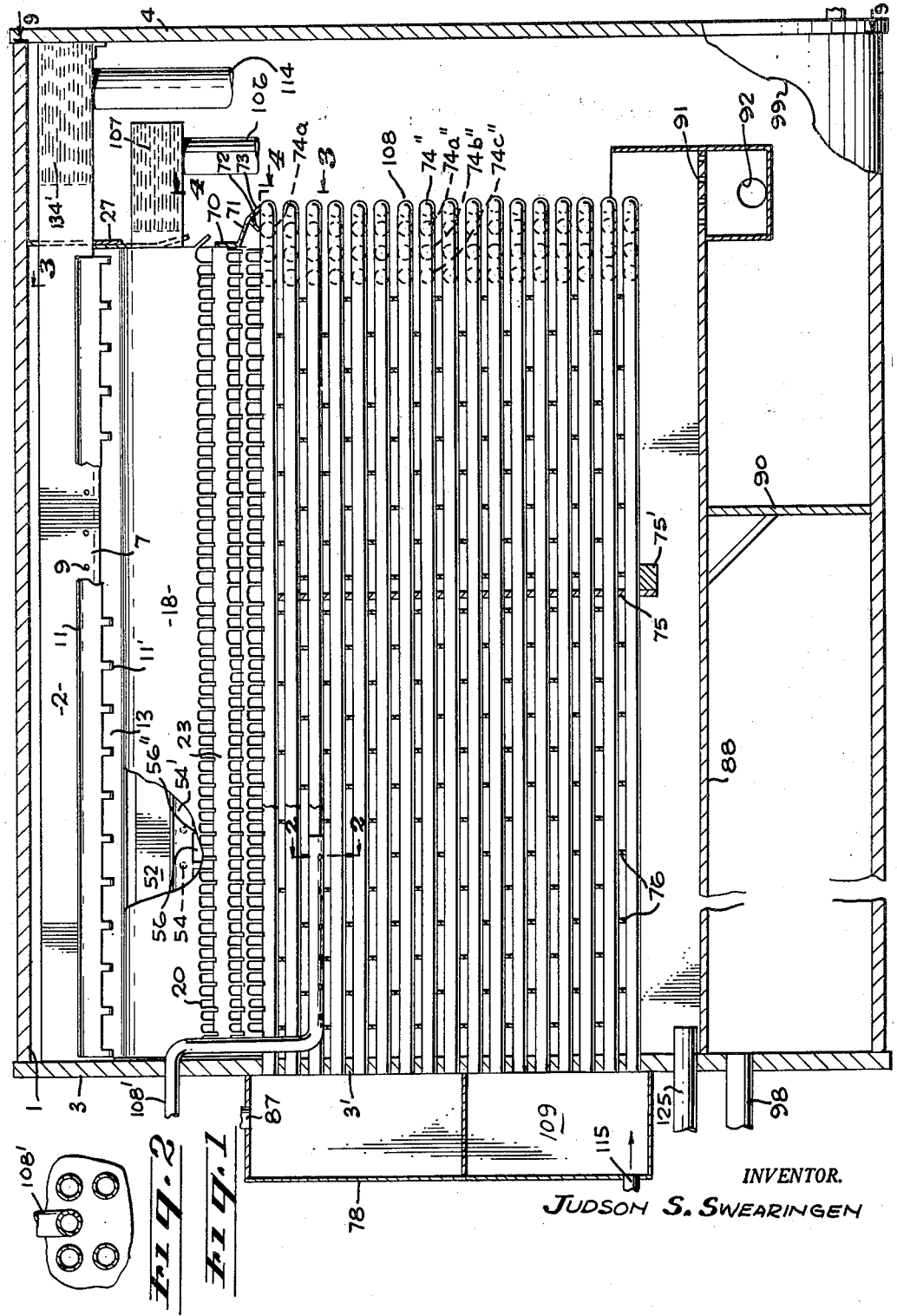

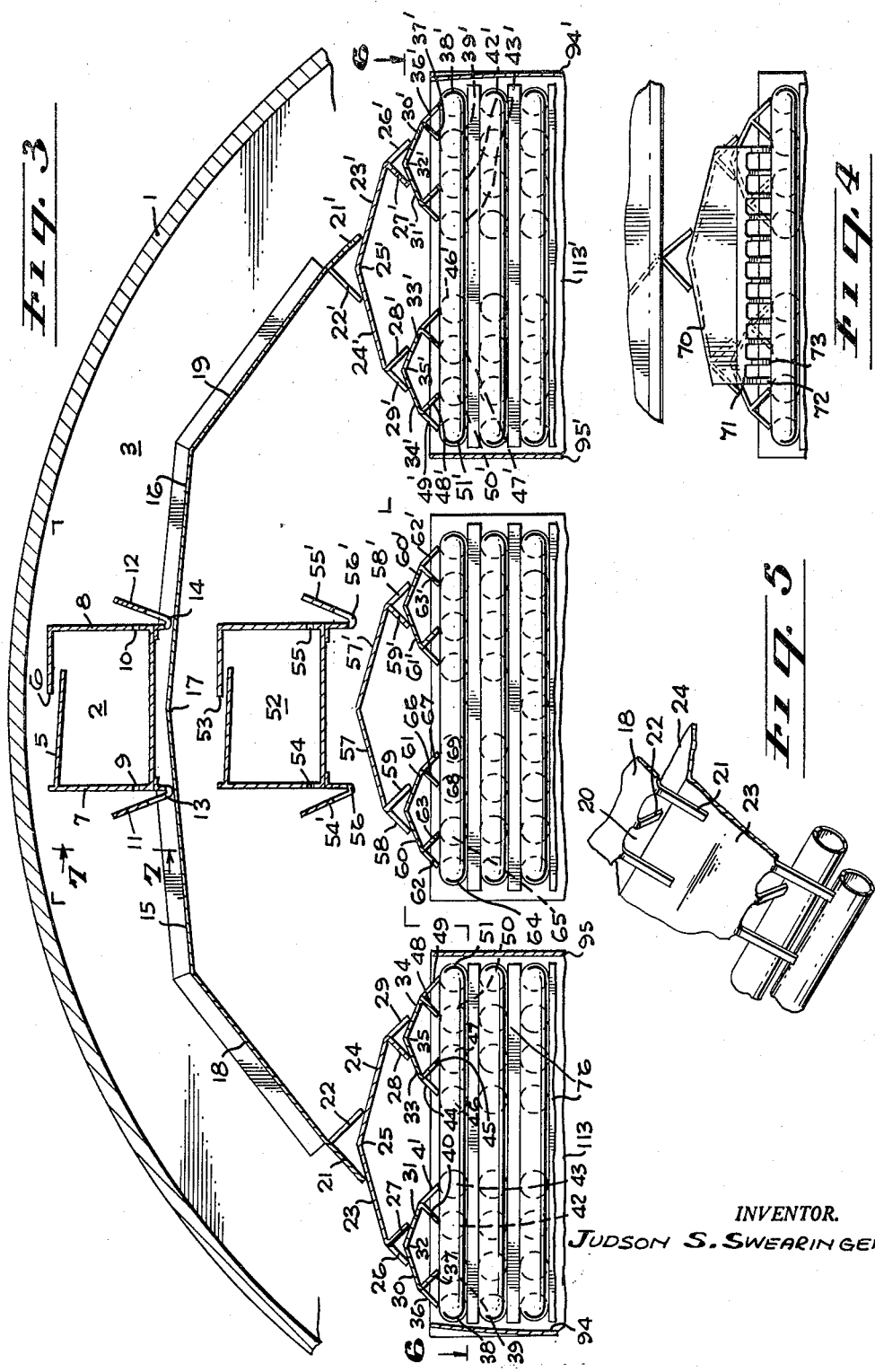

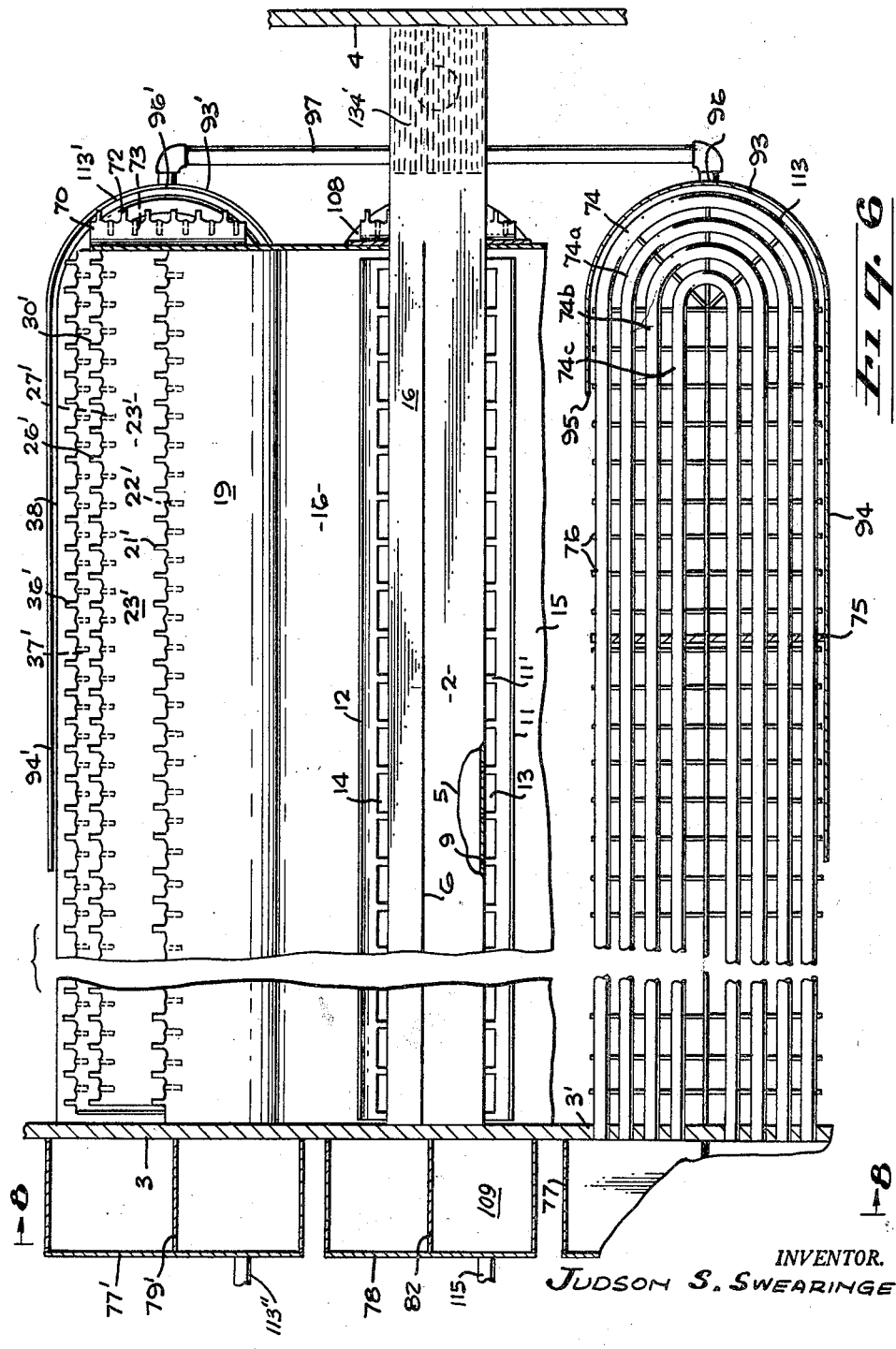

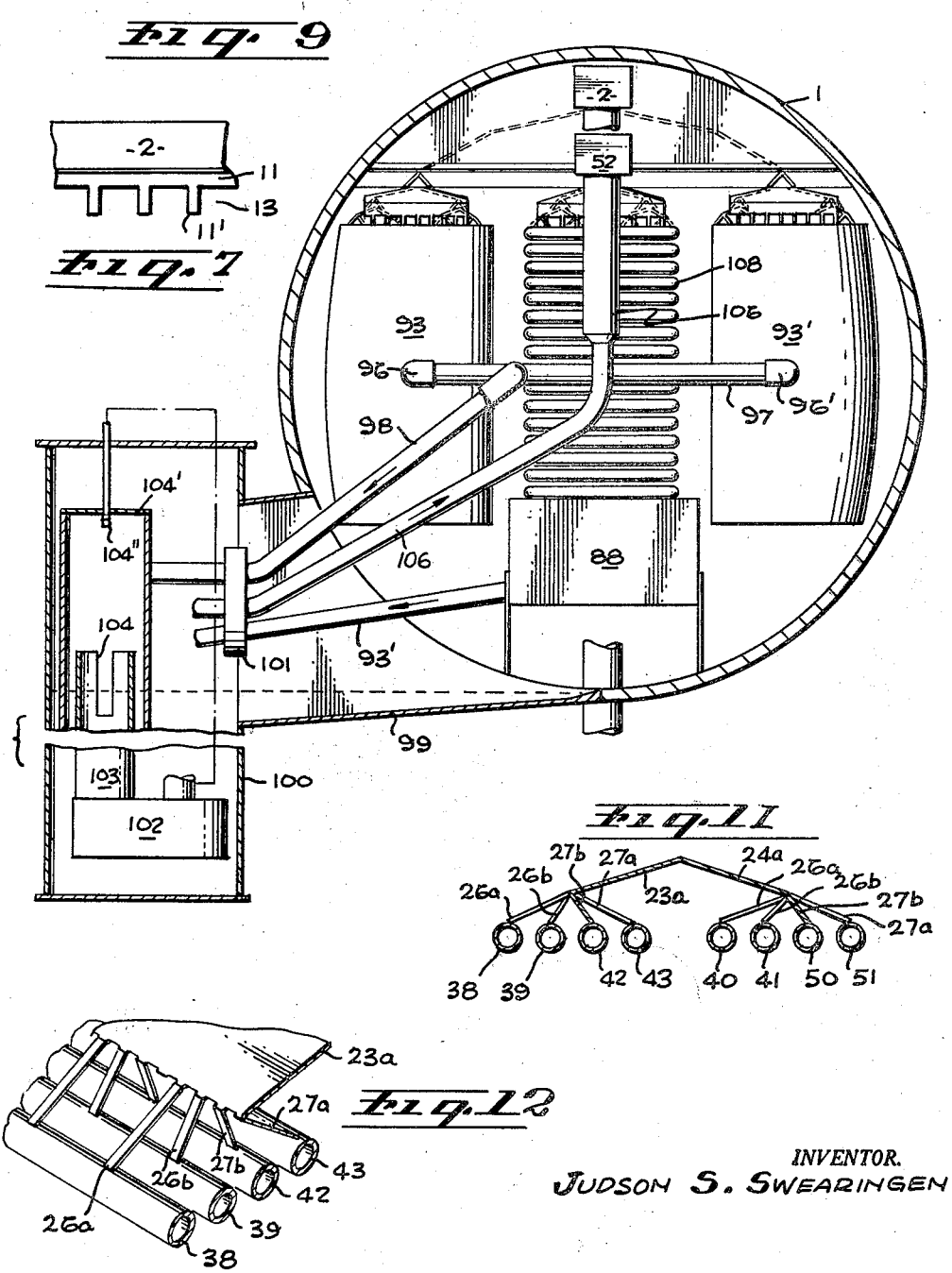

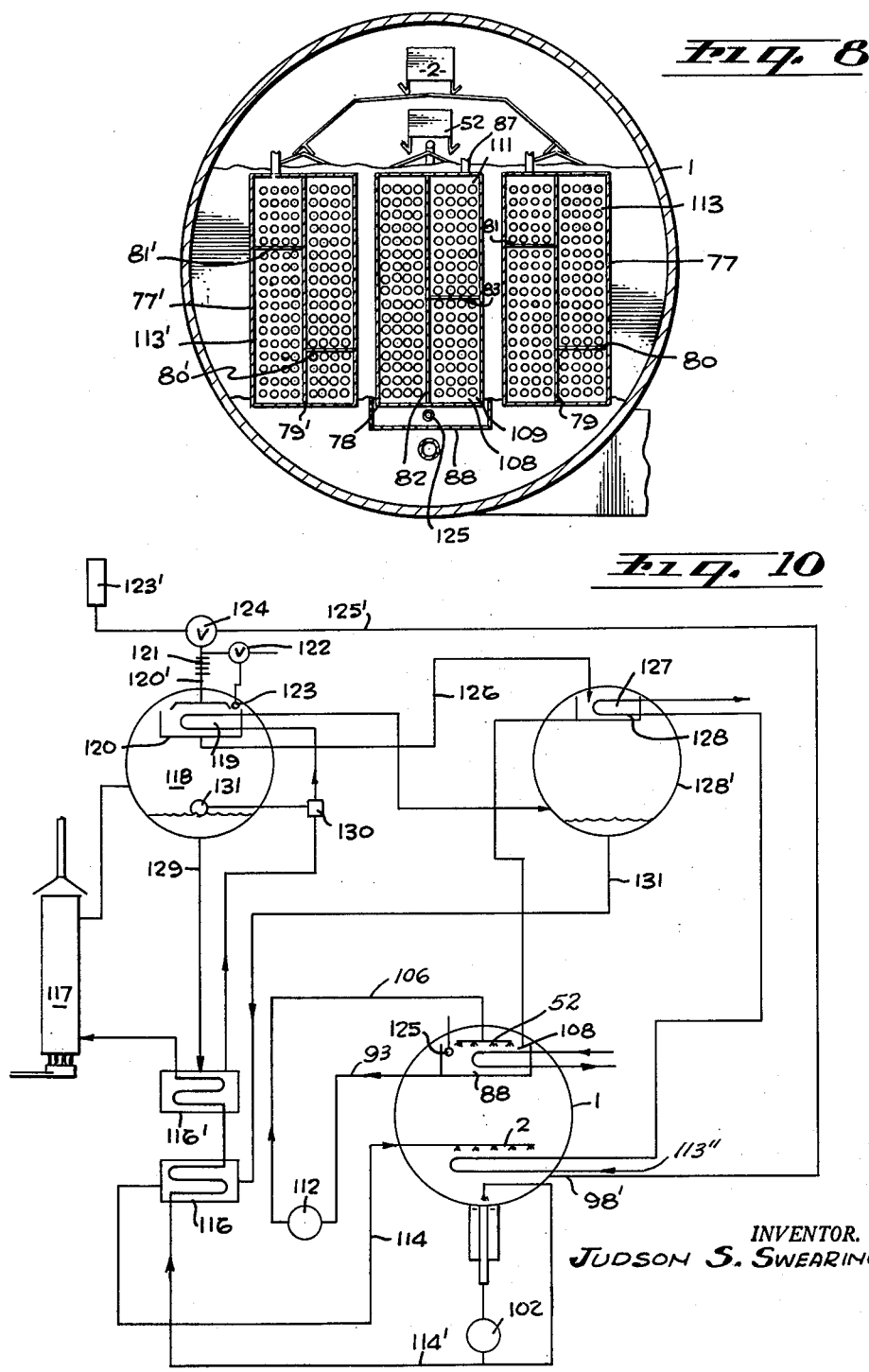

3,195,323
METHOD AND APPARATUS FOR VAPOR AND LIQUID CONTACT
Judson S. Swearingen, Los Angeles, Calif., assignor, by mesne assignments, to Electronic Specialty Co., Los Angeles, Calif., a corporation of California
Filed Sept. 4, 1962, Ser. No. 221,180
20 Claims. (Cl. 62—485)

This invention is an improvement in which liquids are subjected to a treatment wherein it is desired to extend the liquid to thin films on rods or tubes arranged in an array of rows. Such is the case in film type heat exchangers employed in evaporators or in the treatment of a liquid in contact with a vapor or gas as for example, in absorbers of absorption refrigeration systems. The invention, although I have applied it to absorption refrigeration systems, will find more general applicability as will be understood by those skilled in the art. This invention also relates to absorber-evaporators employed in absorption refrigeration apparatus to which the liquid distribution process of my invention may be applied.

This invention finds a useful application in film type heat exchanges in which heat transfer is to or from a liquid stream distributed to flow over and down a bank of tubes. Heat exchange may result in an evaporation of the liquid or in a cooling or heating thereof. It is also useful where the liquid film is employed to absorb a gas or vapor.

One of the major problems in such systems especially where the volume flow of liquid is restricted and sufficient only to form a thin film of liquid on the tubes, is to obtain a uniform film formation and distribution over the surface of the tubes. Since films, by capillary action due to surface tension in the film, tend to separate and split so as to drip in discreet streams, portion of the tube surfaces are not wetted under such condition. Further, any departure of the tubes in the bank from true horizontal causes a segregation of the stream to cause the film at the higher reaches of the tube to become impoverished of liquid. The result is marked reduction in the efficiency of heat transfer. A further problem is to obtain a uniform distribution of liquid as between all of the tubes of the tube bank or tube banks employed in the system.

In the method of my invention I cause a stream of liquid to flow over a series of extended surfaces arranged in cascade. The liquid, which is supplied to the upper reaches of an inclined plane of said cascade, spreads over the extended plane in the form of a sheet of liquid. The sheet of liquid leaves the extended plane and is subdivided into a plurality of sheets of liquid. The volume of liquid applied to each of the succeeding planes in the cascade is less than the volume of liquid leaving an inclined upper plane of said cascade. The liquid spreads out uniformly over each of the cascaded planes. The sheet of liquid departing from the lowest of the cascaded planes is distributed to each of the tubes in the top row of the array of rows in a tube bundle. This is accomplished by means of distributing surfaces which receive the flow from the lowest of the cascaded planes and distribute the liquid over the entire length of each of the tubes of the bank of tubes. The cascaded planes are of such linear dimensions and arranged in such manner so that, aided by the above distributing surfaces which receive the liquid from the lowest plane, a uniform distribution of liquid film occurs over the surfaces of the top row of tubes of said bundle of tubes.

The said cascaded planes and the distributing surfaces ensure the uniform distribution of the liquid to that the tubes of the bundle or bundles of tubes each receive a substantially equal portion of the liquid being distributed.

When I employ the tubes in tube bundles, it is desirable that the lower row of tubes be uniformly wetted by discharge of liquid from the upper tubes of the tube bundle. The tendency of thin films to agglomerate into drops heterogenously distributed over the length of tubes, causes a nonuniform wetting of the lower tubes by droppings from the upper tube. Additionally, when the tubes are off horizontal, the drops may run down the length of the tubes and accumulate in the lower regions of the tubes. This also results in a nonuniform wetting of the lower tubes. In order to prevent such agglomeration, and to distribute the liquid flow from an upper tube to a lower tube, I introduce barriers spaced along the underneath surface of each row of tubes and between the upper tubes and the lower tubes. When the tubes are somewhat off horizontal they will prevent the liquid from flowing along the length of the tube and prevent an accumulation of liquid into layers of sufficient thickness to cause an impoverishment of the upper reaches of the tubes of each row. Capillarity, thus causes a uniform distribution of fluid between the barriers.

The liquid flowing over and around the tube flows along the underneath side of the tube and along the barriers which distribute the flow over the next lower tube of the bundle.

In combination with the means for distributing the liquid in a uniform film over the length of the uppermost rows of tubes, the even distribution of the liquid flowing from the underneath surfaces of the upper tubes to the lower row of tubes by means of the barriers, results in a uniform distribution of liquid over the surfaces of all of the tubes in the bundle of tubes.

My invention is particularly applicable to absorption refrigeration systems in which the ratio of the tubes surface to the liquid volume flow is relatively high. This occurs in the evaporator section where the heat exchange between the fluid to be refrigerated and the liquid refrigerant is obtained. This large surface to volume ratio is also the case in the absorber section where the absorbent liquid is passed over cooling coils to cause an absorption of the vapor which is produced by vaporization in the evaporator.

It is therefore desirable, in order to increase the efficiency of the absorber and evaporator, and reduce the volume of the absorption space and evaporator space, to employ an extended surface of absorbent liquid by employing a multiple row tube bundle in the evaporator section and in the absorber section, and to nest them in one envelope in which I may employ nested cascade systems of liquid distribution to the various tube bundles. This is accomplished by extending it as a film by the means described above.

This invention will be further described by reference to the drawings in which FIGURE 1 illustrates a vertical section through an absorber evaporator of my invention, to which my novel method of distribution of fluid over the banks of the coils may be applied.

FIGURE 2 is a section taken on line 2—2 of FIGURE 1.

FIGURE 3 shows an enlarged section detail of the structure shown in FIGURES 1 and 3 taken on line 3—3 of FIGURE 1.

FIGURE 4 is a detailed section on line 4—4 of FIGURE 1.

FIGURE 5 is a perspective view of a detail of my invention.

FIGURE 6 is a fragmentary sectional detail taken on line 6—6 of FIGURE 3.

FIGURE 7 is a sectional view taken in line 7—7 of FIGURE 1 with parts omitted.

FIGURE 8 is a section on line 8—8 of FIGURE 6 with parts broken away.

FIGURE 9 is a section on line 9—9 of FIGURE 1 with parts omitted.

FIGURE 10 is a schematic flow diagram of an absorption refrigeration process in which my invention may be employed.

FIGURE 11 shows a modification of the structure shown in FIGURES 2 and 7.

FIGURE 12 is a fragmentary perspective view of the structure shown in FIGURE 11.

The absorber-evaporator unit shown in the above figures is formed of shell 1. Three tube bundles are positioned in the shell 1. The central bundle similarly constructed forming the evaporator section 108. Each external bundle 113 and 113' are the absorber section (see FIG. 8). The tube bundles which are composed of a plurality of bent tubes nested in rows and arranged in an array of rows to form the tube bundle, will be more fully described below.

The shell 1 carries across the upper part thereof a rectangular box conduit 2, see FIGURES 1, 3, 6 and 8, carried on the end walls 3 and 4. The top 5 of the conduit has a longitudinal slot 6 extending along a portion the length thereof, as will be more fully described. Side walls 7 and 8 of the box conduit 2 has a plurality of aligned orifices 9 and 10 spaced along and adjacent to the bottom end of the walls 7 and 8, see orifices 9 in FIGURE 1. The walls 7 and 8 have depending V-shaped flanges 11 and 12 which are slotted at 13 and 14, separated by ligaments 11' (see FIG. 1), thus providing openings for the flow of liquid from the orifices 9 and 10.

Positioned underneath the conduit 2 are polygonal sheets of metal, hereinafter called plates, formed of inclined planes 15 and 16 (see FIG. 3) forming a dihedral angle with its apex at 17 positioned axially aligned with the box conduit 2, and also inclined planes 18 and 19 forming a dihedral angle with the surfaces of the inclined planes 15 and 16. The planes 15, 16, 18 and 19 extend across the length of the shell, see FIGURES 1 and 3, and are connected at one end to wall 3 and are supported by the plate 27' described below.

The plates 18 and 19 terminate in reverse bent fingers forming an angle with each other. FIGURE 5 illustrates the orientation of the fingers and planes common to all of the plates and applies also to plates 18 and 19. The lateral end of each plate is slotted by notches 20 providing intermediate fingers 21 and 22 which are bent in opposite directions as illustrated in FIGURES 3 and 5; the fingers 21 resting upon a plate 23 and the fingers 22 resting upon a plate 24. Plane 19 is similarly notched to provide reverse bent fingers shown at 22' and 21' resting on planes 23' and planes 24'. These planes 23 and 24 form a dihedral angle with each other joining at an apex 25 between the bent fingers 21 and 22. The planes 24' and 23' join at an apex 25' between the bent fingers 21' and 22' and the planes 24' and 23'. The plates 23 and 24 and 23' and 24' are carried at one end on the end wall 3. The plates 23 and 24, 23' and 24' are each notched similarly to notches on the planes 18 and 19 to give reverse bent fingers 26 and 27 for plate 23 and 28 and 29 for plates 24 and 26' and 27' for the plates 23' and 28' and 29' for the plates 24'. Positioned underneath the fingers 26 and 27 are two plates 30 and 31 which join in a dihedral angle with its apex at 32 between the fingers 26 and 27 and a similar structure formed of plates 33 and 34 joining in a dihedral angle with its apex at 35, is positoned between the fingers 28 and 29. Similar structure composed of plates 30' and 31' which join in a dihedral angle with its apex at 32' are positioned between the fingers 26' and 27' and similar structure formed plates of 33' and 34' joining at an apex 35' are positioned between the fingers 28' and 29'.

These plates are notched to provide reverse bent fingers similarly to those described above. The fingers 36 and 37 at the end of plates 30 rest on reverse bent tubes 38 and 39 and the reverse bent fingers 40 and 41 rest on the reverse tubes 42 and 43. The reverse bent fingers 44 and 45 at the end of the plate 33 rest on tubes 46 and 47 and the reverse bent fingers 48 and 49 rest on the tubes 50 and 51. The reverse bent fingers of the structure composed of the plates 30' and 31'; 33' and 34', rest on tubes 38', 39', 42', 43', 46', 47', 50' and 51' in a manner previously described for the tube bundle 113. Similar parts being marked with prime numbers to correspond to the unprimed numbers in the previously described bank of tubes.

It will be noted that the construction of the cacaded plates and the reverse bent fingers on plates 18, 19, 23, 24, 30, 31, 33, 34 and the corresponding plates marked with similar but primed numbers are all similar and correspond to the illustration of FIGURE 5.

Carried on the walls 3 and 4 is a box conduit 52 formed in the manner similar to that described for 2 carrying longitudinal slot 53 and bores 54 and 55 positioned at the bottom of walls 52 similar to the bores 9 and 10 and having depending U flanges 54' and 55' carrying notches 56 and 56' and ligaments 56" (FIG. 1) similar to the depending flanges 11 and 12 and slots 13 and 14 and ligaments 11'. Mounted beneath the box conduit 52 is a cascaded planar structure described previously. It is composed of the plates 57 and 57' joined at an apex axially aligned with the box conduit 52 and having reverse bent fingers 58 and 59 and 58' and 59' directed similarly to the structure composed of the plates 23 and 24. The fingers 58 and 59 rest upon a structure composed of plates 60 and 61 joined at dihedral angle with an apex between the fingers 58 and 59 and having the reverse bent fingers 62 and 63 at the end of plate 60 and resting on tubes 64 and 65 in the manner similar to that shown in FIGURE 5 for plates 30. In like manner the plate 61 terminates reverse bent fingers 66 and 67 resting on the tubes 68 and 69 in the manner similarly to that described for the fingers 40 and 41. A similar structure is provided between the fingers 58' and 59' and the similar parts carry like numbers but primed.

The ends of the plates 23 and 24, 23' and 24', 57 and 57' are each adjacent to a plate 70 which terminates in an angular depending section 71 which is notched with a plurality of notches to form reverse bent fingers 72 and 73 which rest on the return bend for the outside tubes of the tube bundle and the return bend 74a (see FIGS. 1, 4 and 6) of the next inner tubes of the bundle. A similar structure is positioned at the end of the structure formed of the plates 23 and 24 and 56, 57 and 23' and 24'.

While I have shown the fingers as resting on the surfaces upon which they discharge the flow of liquid flowing down the fingers and thus provide a mechanical support for the planes, they may be spaced from their planes if their function as supports is not required.

The plate 27' (see FIG. 1) at each end extending over end fingers, which are bent outwardly (see FIG. 1) is bent outward at an angle to be directed over the angularly disposed portion 71 of plate 70 to direct the flow of liquid from the end plates 18 and 19 to flow over the plate 70 positioned over the end of the tube bundles 113 and 113' (see FIG. 4).

The wall 3 is perforate to form a tube sheet for the tube bundles (see FIG. 1 and FIG. 8). The two outside banks of tubes 113 and 113' forming the absorber section and the central bundle of tubes 108 constituting the evaporator section, each are formed of four nested reverse bent tubes similarly constructed to the tubes 38, 39, 42, 43, 46, 47, 50 and 51 with a return bend 74, 74a, 74b, 74c to form a hairpin U tube section nested to give four tubes in an array of rows to form the bundles. The return bends for the tube bundle 113' are marked with prime numbers and those for the evaporator section with double prime numbers.

The tubes in each bundle are carried in a tube sheet 3' forming part of wall 3 and also in a tube spacer 75 carried on a cross-beam 75' arranged chordally of the cylinder (see FIG. 1). Between each row of tubes is a plurality of rods 76 of rectangular cross-section spaced along the length of the tubes and extending across the width of the tube bundle and contacting the upper and lower tubes between which they are placed, as is seen in FIGS. 1 and 3. They are preferably arranged in staggered formation from row to row as shown in FIG. 1.

The ends of the tubes as they exit from the tube sheet 3' in wall 3 are each enclosed in a box attached to the wall 3 at the tube sheet. The box for the tube bundles 113 and 113' in the absorber section being shown at 77 and 77' and a box for the tube bundle in the central evaporator section 108 shown at 78. See FIGS. 1, 6 and 8.

The box at 77 is separated into four compartments by a vertical wall 79 and by two transverse walls 80 and 81. Box 77' is similarly separated to four compartments by similar walls identified by like numbers primed. The central box 78 is separated to three compartments by a central vertical wall 82 and transverse wall 83 to be more fully described below.

Interior of shell 1 and positioned underneath the central evaporator tube bundle is liquid collecting pan 88 carried on the end wall 3 and upon supporting structure shown at 90, see FIG. 1. It terminates in a perforated section 91 to which an outlet 92 is connected to be described below.

The two absorption tube bundles 113 and 113' are encased in the shields shown at FIGURES 1, 6, 8 and 9 formed of an end curved shield section 93 which conforms to the curvature of the return bend of the tube bundle 113 and extends along the exterior portion of the tube bundle with transversely convex section 94 on the exterior side of the bundle and a straight shorter section 95 on the interior side of the bundle. A like shield is provided for the tube bundle 113' similarly identified by like primed numbers. Centrally of the curved section 93 and 93' is a gas tap 96 and 96' which is connected to a manifold 97 and a gas injection line 98 which will be described more fully below.

At one end of the shell 1 is a tunnel 99 which terminates in a vertical tubular section 100 forming a well which is in liquid and vapor communication with the interior of shell 1. The tunnel 99 carries a plate 101 through which tubular members to be described below are passed. Interiorly of the well is positioned a gas ejection apparatus and an absorption liquid circulation system composed of a pump 102 to the inlet of which is connected to a vertical tube 103 slotted at 104. A bell 104' is suitably carried on tube 103 by a spider not shown and connected to pipe 98 passing through the plate 101. From the outlet of the pump 102 a pipe passes, as will be described below to the regeneration system and also by means of a pipe 103 into a nozzle 104'' from which liquid is ejected. The ejected stream entraps gas entering through 98 along with the absorbent liquid passing from the shell 1 into the well 100 and through the slot 104. Liquid collected in 88 passing through outlet 92, pipe 93' also passes through the plate 101 to be connected to a suitable pump which may be positioned in the well 100 and driven by the same motor driven pump 102 but not shown in FIGURE 9. It is schematically shown on FIGURE 10 at 112.

Refrigerant liquid removed from 88 is pumped by pump 112 and line 93' (see FIGURES 9 and 10) through a pipe 106 to pass into the box 52 through a velocity diffuser schematically shown at 107 to flow along the conduit 52 to be more fully described below. The slot 53 (see FIG. 3) stops short of the diffuser 107 (see FIGURE 1) but extends the length of the conduit to permit separation of vapor.

Additional fluid to be passed over the evaporator tubes may be introduced from a source to be described below via pipe 108' (see FIGURE 3) positioned in the third row of tubes between the tubes lying underneath tubes 69 and 64' of the top row. This auxiliary liquid source is required when using the system in an absorption refrigeration system as described below. Pipe 108' is perforated along its length for purposes to be described more fully below.

For the purposes of further description of the operation of my invention, I will illustrate it by its application to an absorption refrigeration system employing water as a refrigerant and a salt solution as an absorbent. As will be understood by those skilled in this art, the above-described structure and also the method and cascaded planes for distribution and formation of films on tube surfaces has other and more general utility.

In such absorption refrigeration systems, to which my inventions may be applied, refrigeration occurs by the passage of fluid to be refrigerated through the evaporator coils i.e. through the interior of the tubes of the tube bundles 108. Referring to schematic flow diagram FIGURE 10 and also to FIGURE 8, this is the central bundle of tubes 108 shown in FIGURES 2 and 3, terminated, in the tube sheet and enclosed in the box as described above. The fluid to be refrigerated enters into compartment 109 through 115, see FIGURES 1 and 6, and passes into the eight parallel rows of tubes terminating in the chamber 109 (see FIGS. 1 and 8). It then passes through the return bends and exits through the adjacent row of tubes into the chamber 78. There being no barrier the fluid then enters the upper nine rows of tubes, passes through the return bends and exits into chamber 111 and departs through conduit 87 for disposal as desired. The heat exchanger there illustrated is a four pass heat exchanger. Similarly, cooling fluid passes through the tubes in the tube banks 113 and 113', as is shown schematically on FIG. 10.

Refrigerant liquid e.g. water contained in the conduit 52 whose source will be described below, passes over the tubes in the manner to be described below, together with refrigerant. The refrigerant liquid introduced through pipe 108' partly flashes to vapor. The pressure in the shell 1 and therefore at the exit of 108' is sufficiently low to produce the partial vaporization of the liquid introduced through 108'. Merely for purposes of illustration, where the liquid is water, the pressure in the shell 1 may be of the order of a few millimeters of mercury. The liquid contained in the box 52 exits through the orifices 54 and 55 positions along its length, impinges on the ligaments 54' and 55' and flows through the notches 56 (and 56') to be distributed over the plates 57 and 57'. The inclination of the plates is such that the liquid is distributed uniformly over and as a sheet across the plates 57 and 57'; being uniformly and substantially equally distributed by means of the orifices 56 and ligaments. The sheet of liquid reaches the fingers 58 and 59 and is evenly subdivided or "sampled." Substantially half of the stream from 52 will be distributed to reverse bent fingers 58 and 59 and half of the stream to fingers 58' and 59'.

The volume role of flow related to the area of the plates 57 and 57' is such that the liquid flows by capillary attraction along the surfaces of the reverse bent fingers, from 58 to plate 60, from 59 to plate 61, from 58' to plate 60', from 59' to plate 61'. Thus, the flow from 52 is divided into substantially four equal parts and distributed onto the plates 60, 61 and 60' and 61'. Thus, the volume flow from the box 52 is separated into two equal portions by the plates 56 and 57 and each portion is divided to make four substantially equal portions descending the plates 60, 61 and 60' and 61'. The inclination of the plates 60, 61, 60' and 61' is as is the case of plates 57 and 57' such that the liquid is uniformly distributed over the surface of the plates in a sheet of liquid.

The flow from each of these plates is further and similarly each divided into two parts; descending the fingers 62 and 63; 66, 67; 62' and 63'; and 66' and 67', onto each of the rows of tubes uniformly along the length of the tubes as described above.

The initial volume rate of flow is successively geometrically subdivided by first being distributed over a surface, then subdivided. By flowing over a plurality of cascaded plates and in such manner that the ratio of the volume rate of flow of liquid to the extended surfaces of the cascaded planar liquid distributing surfaces progressively and geometrically decreases the thickness of the liquid film flowing over the extended cascade surfaces. The liquid is thus distributed substantially in equal fractions to all of the tubes of the top row of tubes of the tube bundle 108.

The film flowing from the fingers 62, 63', 66, 67', 62', 63'; 66', 67 thus reaches the tubes. Due to the low volume rate of flow resulting from the attenuation of the fluid stream flowing from 52, the volume of liquid reaching each element of the tube is sufficiently small and the separation between the fingers is sufficiently small that the liquid spreads out as a result of the interfacial surface tension between the tube and the liquid, resulting in a uniform wetting of and film formation on the tubes.

The return bends of the outer two U tubes are also wetted by flowing over the plate 70 and the angularly disposed surface 71 and the fingers 72 and 73. See FIGURES 3 and 6.

Thus, each tube obtains substantially ⅛ of the flow of liquid passing out of the box 52 and the same is uniformly distributed over the whole length of each of the tubes of the upper row of tubes of the bank of tubes 108.

The film flows over the surface of the tubes and is drawn around underneath the surface of the tube, due to the interfacial surface tension between the water and the tube. Its lateral spread is interrupted by the separators 76 and the liquid flows over the separators and onto the lower length of tubes. The liquid then spreads between the separators to wet the entire upper surface of the next lower tube and is drawn underneath the tube. The process is repeated from tube to tube throughout the tube bundle. As will be seen, the separators are placed close together in such fashion that flow along the length of the tube is prevented, and liquid flows onto the next layer of tubes so that each row of tubes is uniformly wetted along its length.

Regenerated absorbent liquid in conduit 2 and coming from a source to be more fully described below flows through orifices 9 and 10 onto the plates 15 and 16 to flow in sheets extended over and across the plates 15, 18 and 16 and 19. The sheets then are directed by fingers 21 and 22 onto the plates 23 and 24 and by the fingers 22' and 21' onto the sheets 23' and 24'. The liquid flows across these latter plates and onto the rows of tubes through the fingers 26, 27; 28, 29; 26', 27', 28', 29'; plates 30, 31; 34, 35; 30', 31'; 34', 35', fingers 36, 37, 40, 41; 36', 37', 40' and 41' in a manner similar to that described for the cascaded distributing plates under conduit 52.

In the system of cascaded planes described above, the terminal planes, that is, the plane adjacent to the tube to be wetted, ends adjacent to and between a pair of adjacent tubes to be wetted by the liquid flowing down the end planes. In the specific embodiment, the end of the planes carry a pair of fingers which thus are directed to the top of two adjacent tubes. I may, if desired, employ a system of three or more fingers bent at angles to each other depending from the end of the terminal plane and thus three or more tubes may be wetted by fingers depending from the same plane. In this fashion, I may reduce the number of plates necessary to wet the same number of tubes.

FIGURES 11 and 12 illustrate such a variation and other variations will be apparent to those skilled in this art. The end of the terminal plane carrying the fingers is centrally positioned between the two outside tubes of the row of tubes to be wetted by the fingers attached to the terminal plane.

The liquid deposited onto the upper rows of tubes 38, 39, 42, 43 and 38', 39', 42' and 43' flows over these tubes and downward and over the tubes of each tube bundle in a manner similar to that described for the tube bundle 108. It will be observed that while each tube in the tube bundles 108 is fed with ⅛ of the flow entering box conduit 52, the tubes of the other tube bundle 113 and 113' receive one-sixteenth of the flow entering the box conduit 2. This will compensate for the greater volume rate of flow of liquid entering 2 and maintain the required flow rate to the tubes to maintain the desired film characteristics.

The number of dihedral units of the cascade system to be employed will depend on the length of the tubes of their diameter and on the total volume rate of flow of liquid. As will be understood by those skilled in the art for any given length of tube of a given diameter, the greater the number of dihedral units the greater the subdivision of the initial flow in geometric progression.

Thus, by proportioning the number and surface area of the plates, the length of the tubes, the diameter of the tubes to the volume rate of flow, the film thickness on the tubes may be regulated to that desired for the heat transfer between the film on the external surfaces of the tubes and the cooling fluid in the interior of the tubes.

A depending finger is attached to the plane and is directed to the top of each tube of the plurality of tubes forming the row.

In FIGURES 11 and 12, I have illustrated a variation of the construction shown in FIGURES 3 and 4 whereby the surfaces 23 and 24, 57, 57', 23' and 24' may each wet a row of four tubes. This makes it unnecessary to employ the dihedral planes 30, 31, 33, 34 or 60, 61, 60' and 61'.

Thus, ends plates 23a and 24a which are illustrative of the above planes 23, 24, 57, 57', 23' and 24', are positioned between tubes 39 and 42 and may terminate in fingers 26a and 27a which are bent in reverse angles and are sufficient length to reach the two outside tubes 38 and 43. The two shorter fingers 26b and 27b are shorter and bent through a more acute angle than 26a and 27a to reach the tops of the tubes 39 and 42. The corresponding plate 24a carries similar arrangement of fingers corresponding parts being of like number but primed.

The distribution of the liquid to the tubes is similar to that described above.

The liquid falling off the lowest row of tubes of the bundle 108 drops into the tray 88, discharges through line 93 and pump 112 into line 106 (see FIGURE 3) passing through the diffuser 107 and into the box 52.

Vapor generated by the evaporation of this liquid in heat exchange with the fluid passing through the tube bundle 108, passes into the shell 1 and flows along the two exterior tube bundles 113 and 113' illustrated schematically by the coils 113 on FIGURE 10.

The liquid flowing over the bank of tubes 113 and 113', in a manner described above, is introduced into the conduit 114 and into the conduit 2, through the velocity diffuser 134'. Vapor released in the box conduit 2 is vented through slot 6 which extends along the length of the conduit and stops short of the diffuser 134'. The liquid from 2 is distributed equally to wet the tubes in the bundle 113 and 113' in the manner described above. Vapor and gas present in shell 1 passes over the tube bank 113 and 113'. The water vapor is absorbed in the salt solution flowing over the tubes and the diluted salt solution is collected in the bottom of shell 1.

The tube banks are enclosed in a shield 93 and 93'. The fluid distribution of the liquid from the box conduit 2 is schematically illustrated by the line 114 and inlet 2 on figure 10 and corresponds to the liquid distribution described above. Gas from an external source may be introduced through inlet 98 underneath the tray 88 (see FIGS. 1 and 10).

This gas entering from a high pressure source travels at high velocity together with vapor from the evaporator tube bundle and enters the tube bundles 113 and 113' and between the shields 93, 94 and 95 and 93', 94' and 95'. Unabsorbed vapor and gas pass to the outlets 96 and 96' and through the pipe 98 into the tube 103, slotted at 104 and sealed by a bell 104' which depends into the liquid in 100. The absorbent liquid falling to the bottom of cylinder 1 from the lowest rows of tubes in the absorber tube bundles, travels down the tunnel 99 into the sump of 100, and enters through the slot 104, in the tube 100. It is picked up by the pump 102 and circulated through a line shown dotted in FIGURE 7 into the nozzle 104' and entraps the gas entering through 98 to enter the pump 102. This circulation of liquid causes a pumping of the gas passing through 98 from the shield which is therefore the lowest pressure region in the shell 1. The gas and vapor, therefore, sweeps over the tube sheets 113 and 113' and over the liquid flowing over the tubes of the tube banks. This method of removal of gases from the absorber is more fully described in my copending application, Serial No. 157,170, filed December 5, 1961, now Patent No. 3,146,604 granted September 1, 1964, of which this application is a continuation in part and which application is hereby incorporated by this reference. The effect of the gases introduced through 98 is further described in my copending application Serial No. 221,194, filed September 4, 1962 which is herewith incorporated by this reference.

The liquid from pump 102 splits in part through line 114' to pass through heat exchanger 116 and the heat exchanger 116' into the heater 117 and is introduced into separator 118 (see FIG. 10). Vapor separated in 118 at a relatively high pressure, i.e., for example, slightly more than ambient pressure existing outside the unit, passes into the condenser section 119 and is condensed and collected in 120. Uncondensed vapor fraction and fixed gases pass through line 120' and air condenser 121. Condensate from the vapor returns to 120 and the remaining uncondensed fixed gases are vented through valve 122 to ambient pressure under the control of a pressure sensor 123 which opens the valve whenever the pressure in 118 is above atmospheric. A vessel 123' is connected to the three way valve 124. This three way valve and its operation and the introduction of gas as is described more fully above mentioned application, Serial No. 221,194, filed concurrently with this application. This valve opens whenever the temperature reported by the temperature sensor 125 positioned in the tray 88 (see FIGS. 1 and 10) shows that the temperature of the liquid in the tray is below a desired temperature level, whereupon this valve opens communication between 123 and line 125' and closes communication between 123' and the air condenser 121. This gas is introduced into shell 1 as described above. The valve 124 closes when the temperature sensor 125 is above a predetermined limit. The effect of the introduction of gas as described herein and more fully described in said copending application, is aided in action by the improved design embodying the inventions of this application. The inventions of this application may be usefully employed for other uses than absorption refrigeration and when employed in absorption refrigeration process may be employed without the gas injection control described hereunder and in my said copending application.

The condensate collecting in 120 is introduced through line 126 into the condenser 127 in shell 128'. The pressure in this condenser 127 is maintained at considerably lower pressure than exists in the 118. The liquid in 120 flashes through line 126 into the chamber 128', suitable provisions for throttling between the shell 118 and 128' may be supplied. Any conventional means as will be familiar to those skilled in the art, may be employed. A preferred method is to employ the liquid seal invention described in my copending application Serial No. 159,708, now Patent No. 3,146,604 granted September 1, 1964 which is herewith incorporated by this reference. The vapor entering through line 126 is condensed by cooling coils 128.

The unvaporized fraction in the 118 paseses through line 129 and through heat exchanger 116'. It flows through valve 130 operated by float 131 and is boiled in the coils 119. It is then introduced into 127 and the generated vapors are condensed by condenser coils 128. The condensate collected along with the condensate formed from the vapors entering through 126 is passed through line 108 (see FIG. 1) as described above. The unvaporized fraction in 128 is withdrawn through line 131 and heat exchanger 116 and passed into the box conduit 2 through lines 114 to pass through a diffuser 134 into the box conduit 2 to be distributed over the absorption coils as described above.

While I have described particular embodiments of my invention for purposes of illustration, it should be understood that various modifications and adaptations thereof may be made within the spirit of the invention as set forth in the appended claims.

I claim:

1. Apparatus for applying a film of liquid to a plurality of tubular surfaces of extended length arranged side by side in a row which comprises an inclined plate of extended longitudinal dimension, means to mount the plate in an inclined position with its longitudinal edge between adjacent tubes of said row, a plurality of adjacent fingers spaced along the longitudinal end of said plate, adjacent fingers along said plates being fastened at an angle to each other, one finger being positioned adjacent one of the said tubes and an adjacent finger being positioned adjacent another of the tubes of said row, means to flow a sheet of liquid over said plate, whereby said liquid flows along said fingers to the said tubes.

2. In the apparatus of claim 1, a plurality of rows of tubes arranged in a tube bundle beneath said first mentioned tubes, barriers contacting the underneath side of the tubes of an upper row of said tube bundle and the upper side of the tubes of the next lower row of said tube bundle, said barriers being positioned between and spaced from each other along the tubes of an upper row and the tubes of the next lower row whereby liquid flowing over the tubes of an upper row flow along and over the next lower row between said barriers.

3. An apparatus for applying a film of liquid to a row of tubular surfaces of extended length arranged side by side in a row, a pair of inclined plates each plate of extended longitudinal dimension arranged in a dihedral angle and the longitudinal ends of said plates extending along and mounted above the said row of tubes, a plurality of adjacent fingers spaced along the longitudinal end of each of said plates, adjacent fingers on each of said ends being positioned at an angle to each other one of said fingers being positioned on one of said tubes and an adjacent finger being positioned on another tube of said row, means to flow a sheet of liquid over each of said plates whereby said sheet of liquid flows along said fingers to said tubes.

4. In the apparatus of claim 3, a plurality of rows of tubes arranged in a tube bundle beneath said first mentioned tubes, barriers contacting the underneath side of the tubes of an upper row of said tube bundle and the upper side of the tubes of the next lower row of said tube bundle, said barriers being positioned between and spaced from each other along the tubes of an upper row and the tubes of the next lower row whereby liquid flowing over the tubes of an upper row flows along and over the next lower row between said barriers.

5. An apparatus for applying a film of liquid to a row of tubular surfaces of extended length arranged side by side in a row, a pair of inclined plates each plate of extended longitudinal dimension arranged in a dihedral angle to each other, means for mounting said plates with the apex of said dihedral angle and the longitudinal ends of said plates extending along and mounted above the said row of tubes, a plurality of adjacent fingers spaced along the longitudinal end of each of said plates, adjacent fingers on each of said ends being positioned at an angle to each other one finger being positioned on one of said tubes and the next adjacent finger positioned at the next adjacent tube of said row, means to flow a sheet of liquid over each of said plates whereby said sheet of liquid flows along said fingers to said tubes.

6. In the apparatus of claim 5, a plurality of rows of tubes arranged in a tube bundle beneath said first mentioned tubes, barriers contacting the underneath side of the tubes of an upper row of said tube bundle and the upper side of the tubes of the next lower row of said tube bundle, said barriers being positioned between and spaced from each other along the tubes of an upper row and the tubes of the next lower row whereby liquid flowing over the tubes of an upper row flows along and over the next lower row of tubes between said barriers.

7. An apparatus for applying film of liquid to a row of tubular surfaces of extended length arranged side by side in a row, a pair of inclined plates, each plate of extended longitudinal dimension arranged in a dihedral angle, a second pair of inclined plates, each plate of extended longitudinal dimension arranged in a dihedral angle, means for mounting said plates with the apex of each of said dihedral angles and the longitudinal ends of said plates extending along and mounted above the said row of tubes, said dihedral angles being spaced from each other, to form a pair of lower dihedral angles, a plurality of adjacent fingers spaced along the longitudinal end of each of said plates, adjacent fingers on each of said ends being positioned at an angle to each other, one finger being positioned on one of said tubes and an adjacent finger being positioned on another tube of said row, an upper dihedral angle comprising of a pair of inclined plates, each plate of extended longitudinal dimension, means for mounting said upper dihedral angle over the first named lower dihedral angles, a plurality of adjacent fingers positioned on each end of said plates of said upper dihedral angle, said fingers being positioned at an angle to each other, fingers at the end of one of the plates of said upper dihedral angle positioned adjacent each of the plates of one of said lower dihedral angles, fingers on the end of the other plate of said upper dihedral angle positioned adjacent the plates of the other of said lower dihedral angle and means for flowing liquid in a sheet over each of said plates of said upper dihedral angle, whereby liquid flows as a sheet over said plates and along said fingers and over said tubes.

8. In the apparatus of claim 7, a plurality of rows of tubes arranged in a tube bundle beneath said first mentioned tubes, barriers contacting the underneath side of the tubes of an upper row of said tube bundle and the upper side of the tubes of the next lower row of said tube bundle, said barriers being positioned between and spaced from each other along the tubes of an upper row and the tubes of the next lower row whereby liquid flowing over the tubes of an upper row flows along and over the next lower row between said barriers.

9. An absorber-evaporator for an absorption refrigeration apparatus comprising a shell, three spaced tube bundles, said tube bundles being comprised of rows of tubes each containing a plurality of tubes, said rows being arranged in a vertical array of tubes forming said tube bundle, means for mounting said bundles in said shell side by side, a liquid collecting tray positioned underneath one of said tube bundles, means to flow liquid over the tubes of each said tube bundles, a shield enclosing two of said tube bundles, means to remove gases and liquid from said shell comprising a sump connected to said shell, a gas ejection pipe in said pump in gas communication with said shields, liquid communication conduit between said sump and said shell, means to form a mixture of said gas and said liquid in said gas ejection pipe and means to pump said mixture, means to circulate liquid from tray to the means for flowing the liquid over said one of said tube bundles.

10. An absorber-evaporator for an absorption refrigeration apparatus comprising a shell, three spaced tube bundles, said tube bundles being comprised of rows of tubes each containing a plurality of tubes, said rows being arranged in a vertical array of tubes forming said tube bundles, means for mounting said bundles in said shell side by side, a liquid collecting tray positioned underneath one of said tube bundles, means to flow liquid over the tubes of each of said bundles, said means to flow liquid over said tubes comprising a plurality of inclined plates of extended longitudinal dimension, means to mount a plate in an inclined position with its longitudinal edge between adjacent tubes of the top row of each of said tube bundles, a plurality of adjacent fingers spaced along the longitudinal end of said plates, adjacent fingers along each said plates being fastened at an angle to each other, one finger being positioned adjacent one of the said tubes of said top row of tubes of each tube bundle and an adjacent finger being positioned adjacent another of the tubes of each of said rows, means to flow sheets of liquid over said plates, whereby said liquid flows along said fingers to the said tubes.

11. In the apparatus of claim 10 barriers contacting the underneath side of the tubes of an upper row of said tube bundle and the upper side of the tubes of the next lower row of said tube bundle, said barriers being positioned between and spaced from each other along the tubes of an upper row and the tubes of the next lower row of each tube bundle, whereby liquid flowing over the tubes of an upper row flows along and over the next lower row between said barriers.

12. An absorber-evaporator for an absorption refrigeration apparatus comprising a shell, three spaced tube bundles, said tube bundles being comprised of rows of tubes each containing a plurality of tubes, said rows being arranged in a vertical array of tubes forming said tube bundles, means for mounting said bundles in said shell side by side, a liquid collecting tray positioned underneath one of said tube bundles, means to flow liquid over the tubes of each of said bundles, said means to flow liquid over said tubes comprising a plurality of inclined plates arranged in a plurality of dihedral angles, means for mounting one of said dihedral angles with the apex of said dihedral angle and the longitudinal ends of said plates extending along and mounted above each of said tube bundles, a plurality of adjacent fingers spaced along the longitudinal end of each of said plates, adjacent fingers on each plate being positioned at an angle to each other one of said finger being positioned on one of said tubes of one of said rows of one of said tube bundles and an adjacent finger kept positioned on another tube of said row.

13. In the absorber-evaporator of claim 12, barriers contacting the underneath side of the tubes of an upper row of said tube bundle and the upper side of the tubes of the next lower row of said tube bundle, said barriers being positioned between and spaced from each other along the tubes of one upper row and the tubes of the next lower row of tubes of each tube bundle, whereby liquid flowing over the tubes of an upper row flows along and over the next lower row between said barriers.

14. An absorber-evaporator for an absorption refrigeration apparatus comprising a shell, three spaced tube bundles, said tube bundles being comprised of rows of tubes each containing a plurality of tubes, said rows being arranged in a vertical array of tubes forming said tube bundles, means for mounting said bundles in said shell side by side, a liquid collecting tray positioned underneath one of said tube bundles, means to flow liquid over the tubes of each of said bundles, said means for flowing said liquid over said tubes comprising a pair of inclined plates, each plate of extended longitudinal dimension arranged in a dihedral angle, a second pair of inclined plates, each plate of extended longitudinal dimension, arranged in a dihedral angle, means for mounting said plates with the apex of each of said dihedral angles and the longitudinal ends of said plates extending along and mounted above the said row of tubes, said dihedral angles being spaced from each other, to form a pair of lower dihedral angles, a plurality of adjacent fingers spaced along the length of the longitudinal end of each of said plates of said lower dihedral angles and along the length of said tubes, adjacent fingers on each of said ends being positioned at an angle to each other, one finger being positioned on one of said tubes and an adjacent finger being positioned on adjacent tube of said row, an upper dihedral angle comprising of a pair of inclined plates, each plate of extended longitudinal dimension, means for mounting said upper dihedral angle over the first named pair of lower dihedral angles, a plurality of adjacent fingers positioned on each end of said plates of said upper dihedral angle and extending along the length of the longitudinal ends of said last named plates, said fingers being positioned at an angle to each other, fingers at the end of one of the plates of said upper dihedral angle positioned adjacent each of the plates of one of said lower dihedral angles, and the adjacent finger in said end positioned adjacent the other plate of said lower dihedral angle fingers on the end of the other plate of said upper dihedral angle positioned adjacent one of the plates of the other of said lower dihedral angle said fingers positioned adjacent the other plate of said last-named lower dihedral angle and extending along the length of said last-named lower dihedral angle, and means for flowing liquid in a sheet over each of said plates of said upper dihedral angle, whereby liquid flows as a sheet over all of said plates and along said fingers and over said tubes.

15. In the absorber evaporator of claim 14, barriers contacting the underneath side of the tubes of an upper row of said tube bundle and the upper side of the tubes of the next lower row of said tube bundle, said barriers being positioned between and spaced from each other along the tubes of an upper row and the tubes of the next lower row of tubes of each tube bundle, whereby liquid flows off the tubes of an upper row and over the next lower row between said barriers.

16. In the absorber-evaporator of claim 15, said means for flowing liquid over said plates comprising a liquid conduit positioned above the apex of said upper dihedral angle and extending along the said apex of said dihedral angle, and openings in conduit positioned in said conduit along the longitudinal dimension of each said plates of said plates of said upper dihedral angle and a vent opening for said conduit.

17. An apparatus for applying a film of liquid to tubular surfaces of extended length arranged side by side in a row, four pairs of inclined plates, each plate of extended longitudinal dimension, arranged in pairs in a dihedral angle, means for mounting said plates with the apex of each of said dihedral angles and the longitudinal ends of said plates extending along and mounted above said row of tubes, said dihedral angles being spaced from each other to form two pairs of lower dihedral angles, a plurality of adjacent fingers spaced along the length of the longitudinal ends of each of said plates of said lower dihedral angles and along the length of said tubes, adjacent fingers on each of said ends being positioned at an angle to each other, one finger being positioned on one of said tubes and an adjacent finger being positioned on another tube of said row; a pair of upper dihedral angles, each upper dihedral angle comprised of a pair of inclined plates, each of said last-named plates being of extended longitudinal dimension; means for mounting each of said upper dihedral angles over each pair of said lower dihedral angles; a plurality of adjacent fingers positioned on each end of said plates of said upper dihedral angles and extending along the length of the longitudinal ends of said last-named plates, said fingers being positioned at an angle to each other, one of said fingers, at the end of one of the plates of said upper dihedral angle, positioned adjacent one of the plates of one of said lower dihedral angles, and the adjacent finger of said end positioned adjacent the other plate of said lower dihedral angle; fingers on the end of the other plate of said upper dihedral angle positioned adjacent one of the plates of the other of said lower dihedral angles, and fingers adjacent said last-named finger positioned adjacent the other plate of said last-named lower dihedral angle and extending along the length of said last-named plate of said last-named lower dihedral angle; a pair of inclined plates of longitudinal dimension positioned above the said pair of upper dihedral angles; means for mounting said third pair above said upper dihedral angles and extending along said plates of said upper dihedral angle, a plurality of adjacent fingers extending along the longitudinal end of each plate of said third pair of inclined plates, one finger of one of said last-named plates being adjacent one of the plates of one of said upper dihedral angles and a finger adjacent to the last-named finger being adjacent to the other plate of said last-named upper dihedral angle, and one of the fingers of the other of said plates of said third pair of inclined plates being adjacent to one of the plates of the other of said upper dihedral angles, and a finger adjacent to the last-named finger being adjacent to the other plate of said last-named dihedral angle; and means for flowing liquid in a sheet over each of said plates of said third pair, whereby liquid flows in a sheet over said plates and along said fingers and over said tubes.

18. In an apparatus of claim 17, a plurality of rows of tubes arranged in a tube bundle beneath said first-mentioned tubes, barriers contacting the underneath side of the tubes of an upper row of tubes of said tube bundles and the upper side of the tubes of the next lower row of tubes of said tube bundles, said barriers being positioned between and spaced from each other along the tubes of an upper row and the tubes of the next lower row, whereby liquid flowing over the tubes of an upper row flows along and over the next lower row between said barriers.

19. An absorber-evaporator for an absorption refrigeration apparatus comprising a shell, three spaced tube bundles, said tube bundles being comprised of rows of tubes, each containing a plurality of tubes of extended length, said rows being arranged in a vertical array of tubes forming said tube bundles, means for mounting said bundles in said shell side-by-side, a liquid collecting tray positioned underneath one of said tube bundles, means to flow liquid over the tubes of each of said tube bundles, said means comprising four pairs of inclined plates, each plate of extended longitudinal dimension, arranged in pairs in a dihedral angle, means for mounting said plates with the apex of each of said dihedral angles and the longitudinal ends of said plates extending along and mounted above said row of tubes, said dihedral angles being spaced from each other to form two pairs of lower dihedral angles, a plurality of adjacent fingers spaced along the length of the longitudinal ends of each of said plates of said lower dihedral angles and along the length of said tubes, adjacent fingers on each of said ends being positioned at an angle to each other, one finger being positioned on one of said tubes and an adjacent finger being positioned on another tube of said row; a pair of upper dihedral angles, each upper dihedral angle comprised of a pair of inclined plates, each of said last-named plates being of extended longitudinal dimension; means for mounting each of said upper dihedral angles over each pair of said lower dihedral angles; a plurality of adjacent fingers positioned on each end of said plates of said upper dihedral angles and extending along the length of the longitudinal ends of said last-named plates, said fingers being positioned at an angle to each other, one of said fingers, at the end of one of the plates of said upper dihedral angle, positioned adjacent one of the plates of one of said lower dihedral angles, and the adjacent finger of said end positioned adjacent the other plate of said lower dihedral angle; fingers on the end of the other plate of said upper dihedral angle positioned adjacent one of the plates of the other of said lower dihedral angles, and fingers adjacent last-named finger positioned adjacent the other plate of said last-named lower dihedral angle and extending along the length of said last-named plate of said last-named lower dihedral angle; a pair of inclined plates of longitudinal dimension positioned above the said pair of upper dihedral angles; means for mounting said third pair above said upper dihedral angles and extending along said plates of said upper dihedral angle, a plurality of adjacent fingers extending along the longitudinal end of each plate of said third pair of inclined plates, one finger of one of said last-named plates being adjacent one of the plates of one of said upper dihedral angles and a finger adjacent to the last-named finger being adjacent to the other plate of said last-named upper dihedral angle, and one of the fingers of the other of said plates of said third pair of inclined plates being adjacent to one of the plates of the other of said upper dihedral angles, and a finger adjacent to the last-named finger being adjacent to the other plate of said last-named dihedral angle; and means for flowing liquid in a sheet over each of said plates of said third pair, whereby liquid flows in a sheet over said plates and along said fingers and over said tubes.

20. In the absorber evaporator of claim 19, barriers contacting the underneath side of the tubes of an upper row of tubes of said tube bundle and the upper side of the tubes of the next lower row of said tube bundle, said barriers being positioned between and spaced from each other along the tubes of an upper row and the tubes of the next lower row of tubes of each tube bundle; whereby liquid flows off the tubes of an upper row and over the next lower row between said barriers.

References Cited by the Examiner
UNITED STATES PATENTS

| | | | |
|---|---|---|---|
| 751,058 | 2/04 | Cracknell | 165—117 X |
| 1,287,630 | 12/18 | Burhorn | 165—116 |
| 2,083,159 | 6/37 | Roe | 165—117 X |
| 2,323,186 | 6/43 | Anderson | 62—494 |
| 2,364,058 | 12/44 | Burk et al. | 137—561.1 |
| 2,729,952 | 1/56 | Whitlow | 62—887 |
| 2,873,140 | 2/59 | Merrick | 239—193 |
| 2,983,110 | 5/61 | Leonard | 62—494 X |
| 2,983,117 | 5/61 | Edberg et al. | 62—476 |
| 2,986,906 | 6/61 | Stubblefield et al. | 62—487 |

ROBERT A. O'LEARY, Primary Examiner.